Nov. 11, 1952 W. H. EVANS 2,617,377

BOAT CONSTRUCTION

Filed Sept. 26, 1947 8 Sheets-Sheet 1

Inventor
William H. Evans

By McLaughlin & Wallenstein

Attorneys

Nov. 11, 1952 W. H. EVANS 2,617,377

BOAT CONSTRUCTION

Filed Sept. 26, 1947

8 Sheets-Sheet 2

INVENTOR.
William H. Evans
BY
McLaughlin + Wallenstein
Attys.

Nov. 11, 1952 W. H. EVANS 2,617,377

BOAT CONSTRUCTION

Filed Sept. 26, 1947 8 Sheets-Sheet 3

INVENTOR.
William H. Evans
BY
McLaughlin & Wallenstein
Attys.

Nov. 11, 1952

W. H. EVANS 2,617,377

BOAT CONSTRUCTION

Filed Sept. 26, 1947

8 Sheets-Sheet 4

INVENTOR.
William H. Evans
BY McLaughlin & Wallenstein
Attys.

Inventor
William H. Evans
By McLaughlin & Wallenstein
Attorneys

Nov. 11, 1952 W. H. EVANS 2,617,377

BOAT CONSTRUCTION

Filed Sept. 26, 1947 8 Sheets-Sheet 6

INVENTOR.
William H. Evans
BY
McLaughlin + Wallenstein
Attys.

Nov. 11, 1952 W. H. EVANS 2,617,377

BOAT CONSTRUCTION

Filed Sept. 26, 1947 8 Sheets-Sheet 7

Inventor
William H. Evans

By McLaughlin & Wallenstein

Attorneys

Nov. 11, 1952

W. H. EVANS 2,617,377

BOAT CONSTRUCTION

Filed Sept. 26, 1947

8 Sheets-Sheet 8

INVENTOR.
William H. Evans
BY
McLaughlin & Wallenstein
Attys.

Patented Nov. 11, 1952

2,617,377

UNITED STATES PATENT OFFICE 2,617,377

BOAT CONSTRUCTION

William H. Evans, Chicago, Ill.

Application September 26, 1947, Serial No. 776,225

3 Claims. (Cl. 114—191)

My invention relates to boat construction. It relates more in particular to a boat, the deck of which is stabilized against movement normally imparted to the hull by water action.

My present invention is a further development of that disclosed in my copending application, Serial No. 620,887, filed October 8, 1945, now Patent No. 2,466,164. As there explained, the invention is concerned with power boats of intermediate size, ranging, in general, from about twenty feet to about sixty feet and of the type generally employed in coastal waters. While the invention may have application for boats of other sizes, its principal concern is with this type of craft. Boats to which the invention is particularly directed are used for pleasure and like purposes in choppy waters off shore with the result that seasickness is frequently encountered and the pleasure otherwise derivable from sport employing such boats is limited.

My invention employs a gyroscope and I am aware that the use of gyroscopes for stabilizing ocean craft was suggested many years ago and to some extent gyroscopes have gone into general use. On large ocean vessels, for example, one or more gyroscopes may be attached to the hull and operated during stormy weather to substantially reduce the pitch and roll which would otherwise result. Those skilled in the art will understand that considerable stability results merely from the size of a craft, as obviously the inertia of a large mass is a factor in resisting the pounding action of waves. When several gyroscopes are attached to the hull, they add greatly to this inertia even though they have a resulting disadvantage in preventing the ocean liner from riding with ground swells and adjusting itself to the undulations of the sea. When riding on an ocean vessel equipped with gyroscopes, one has a distinct feeling that the vessel is diving under a wave instead of riding partly over it, when, actually, the vessel probably maintains only an even keel and does not have any of the usual riding action which occurs in normal weather. The action of a gyroscope equipped vessel obviously is such that small craft cannot be stabilized in the same manner since it is essential that the smaller vessel adjust itself at least to some extent to the medium in which it is supported.

In my prior application, above referred to, I supported a deck structure for free swivelling movement about a support which was carried by the hull, suspended as much of the weight of the deck structure as possible below the pivot and further stabilized the deck structure by means of a gyroscope so that the hull could move freely as it was subjected to wave motion but the deck structure would be stationary with respect to the sea. I have found that with such a structure one could sail in choppy waters for at least several hours without nausea or other symptoms of seasickness. I have found, however, that under some conditions in which there could be successive wave impacts, timed to coincide with the swinging movement of the hull, the hull would have insufficient static equilibrium and the wave action would even appear to be magnified. Since, in any structure, there is a limit to the relative movement which can be permitted to take place between deck and hull, a point is reached at which the instability of the hull is imparted to the deck and the desired immobility of the deck structure is not maintained. While this malfunctioning may result only under certain unusual conditions, I have considered that improvement was essential and it is the purpose of my present invention to improve upon the action of my previously disclosed invention.

In accordance with my present invention, I support the deck structure pivotally with respect to the hull as in the previous embodiment of the invention, but provide additional means to partially resiliently connect the hull and deck structure so that part of the static equilibrium of the deck structure is imparted to the hull but so that the deck structure is never required to take the full impact of a wave such as would cause it to be moved with the hull. This interconnection, I provide by means of springs or equivalent means, and to prevent sudden release of the energy stored in the springs which might itself tend to cause some pendulum action, I preferably provide shock absorbers or similar devices having a snubbing action. Even when springs are used alone without the shock absorber, however, there is some snubbing action due to the fact that the springs may be tensioned to normally hold the hull and deck structure at dead center of the pivot, that is to say, at a position at which the deck is horizontal and the hull lies normally at rest in the water.

I have embodied my invention in a relatively small craft, the principal parts of which are illustrated in the accompanying drawings wherein—

Figure 5:
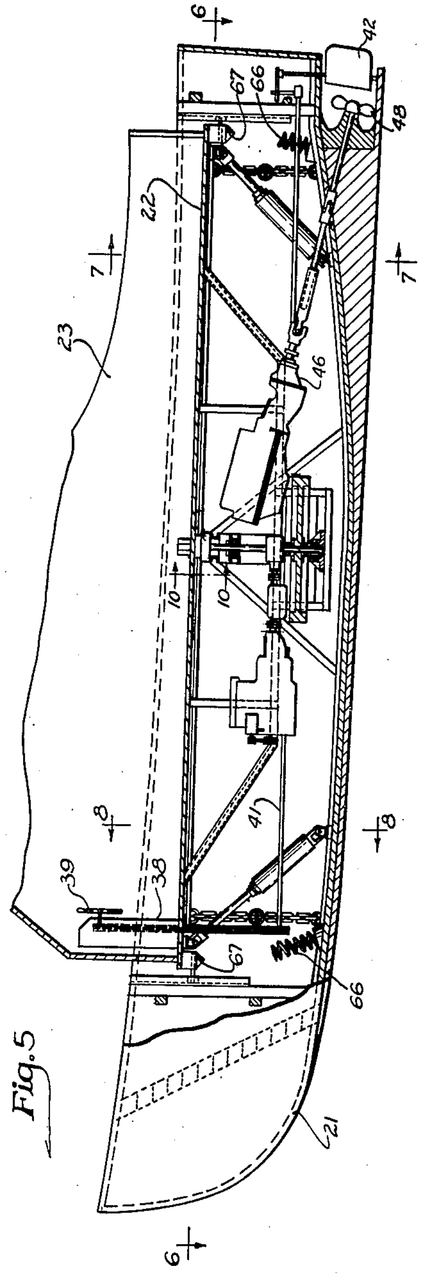
Fig. 5 is a longitudinal fragmentary sectional view taken on the line 5—5 of Fig. 2 looking in the direction of the arrows.
Figure 6:
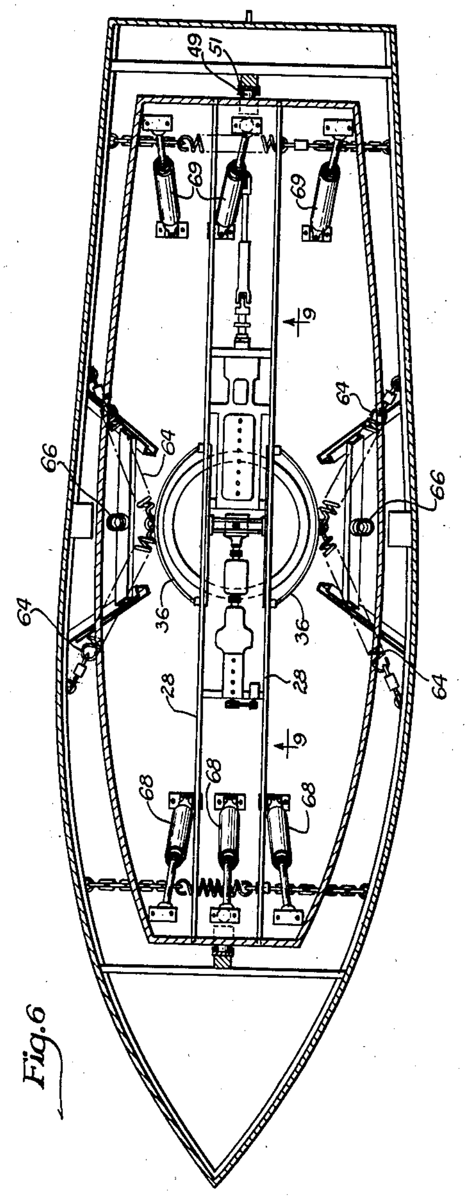
Fig. 6 is a plan sectional view taken on the line 6—6 of Fig. 5.
Figure 7:
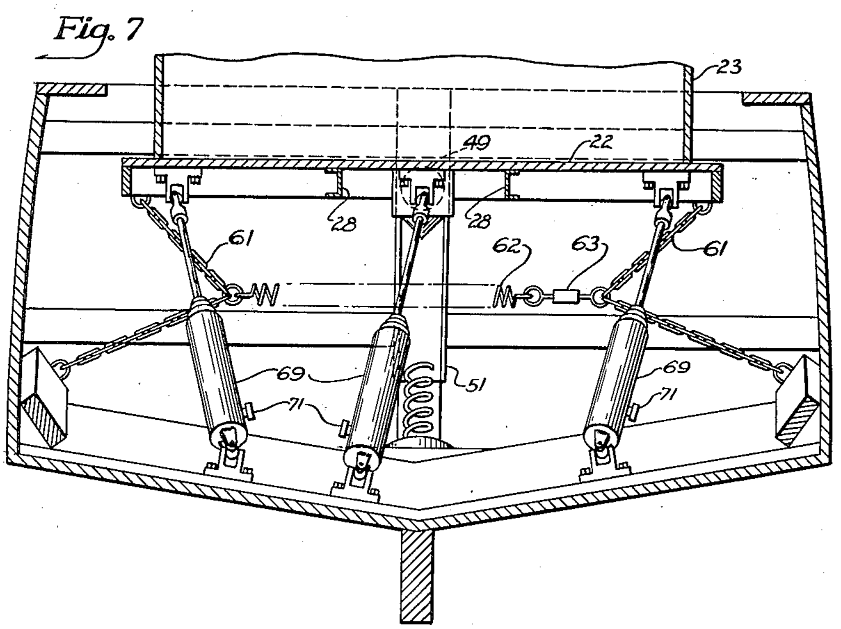
Figure 8:
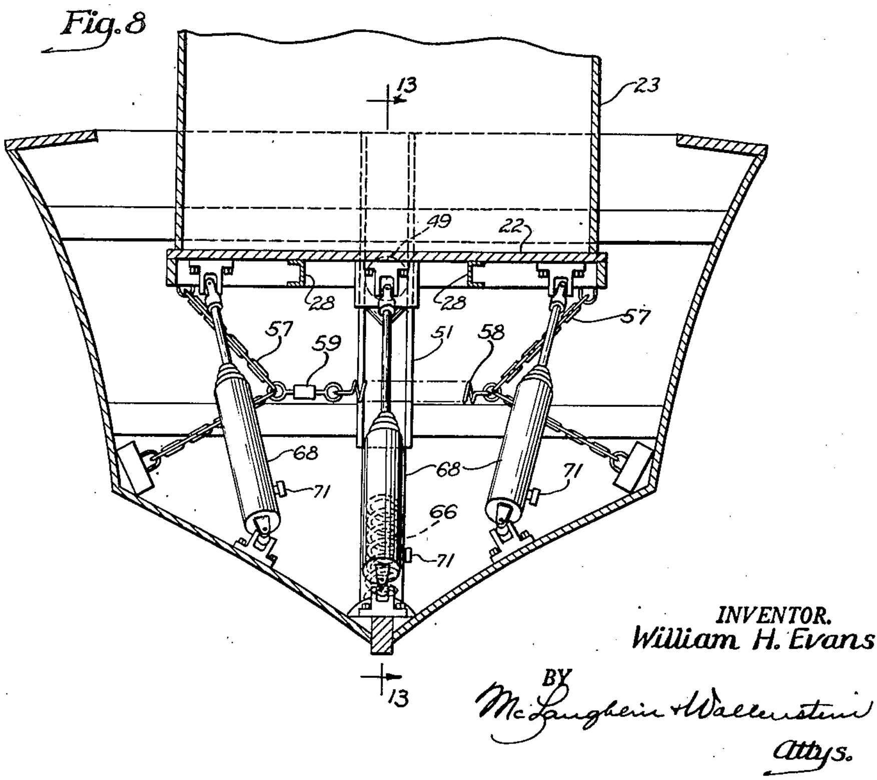
Figure 9:
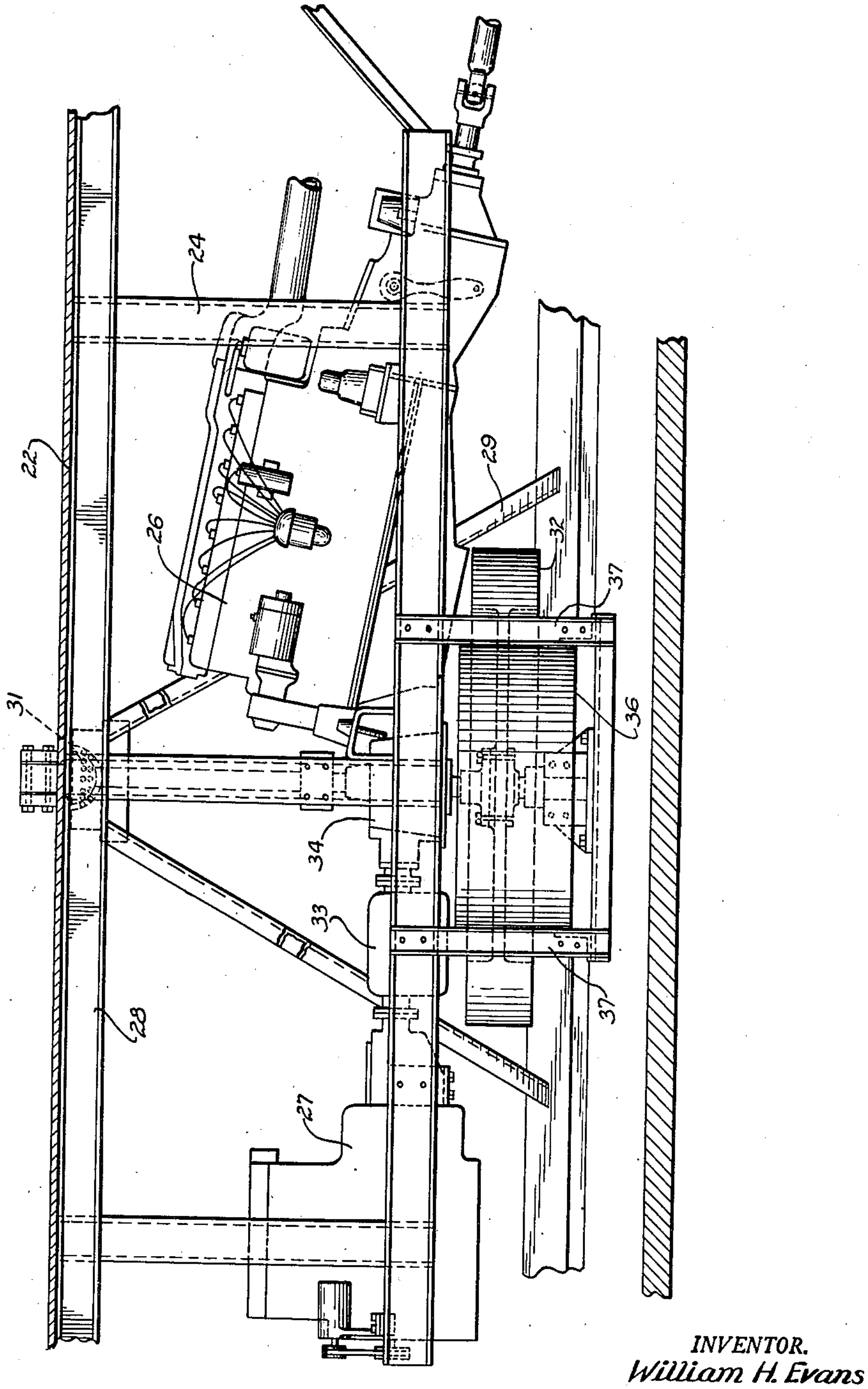
Figures 10, 11:
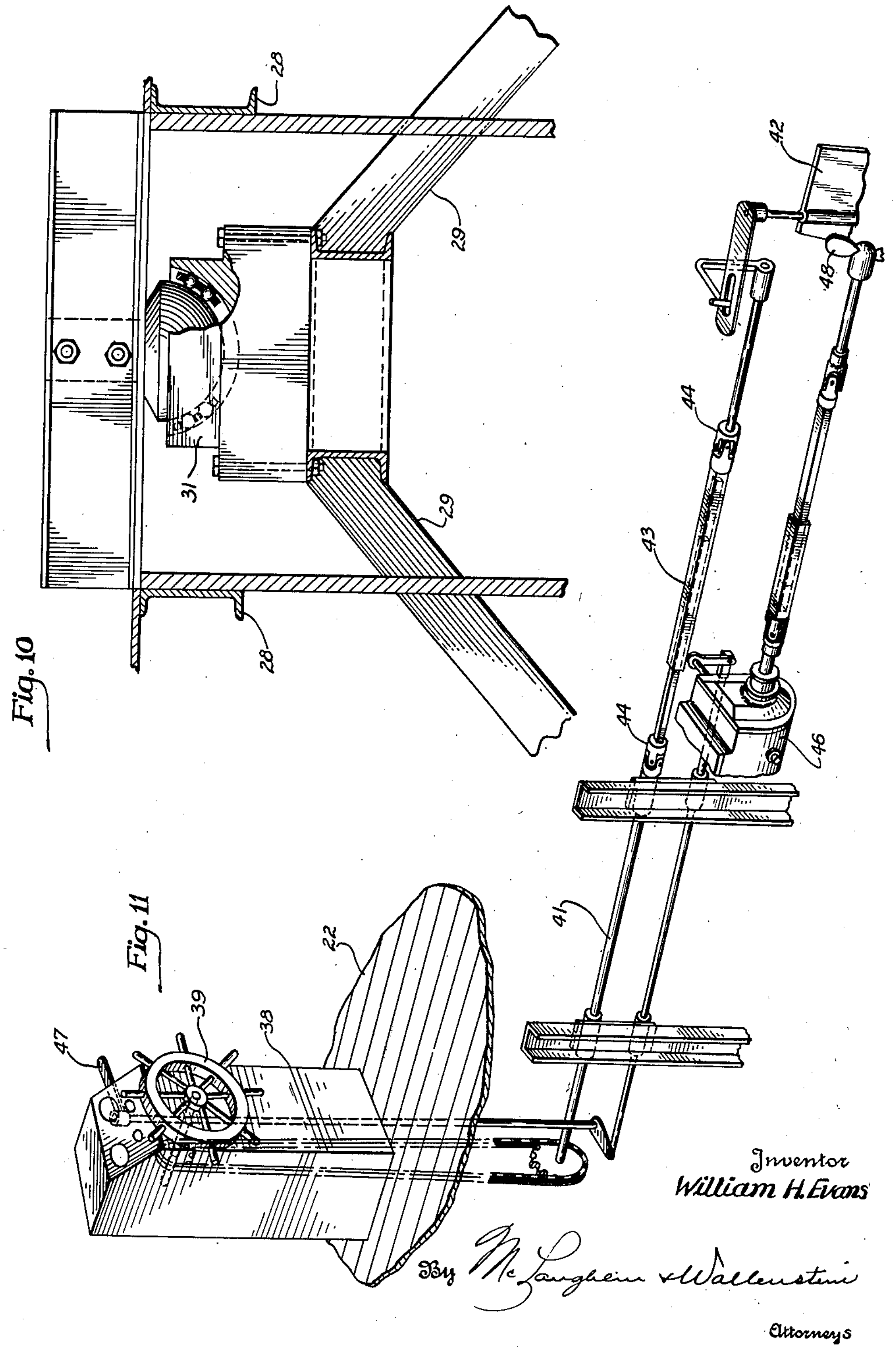
Figure 13:
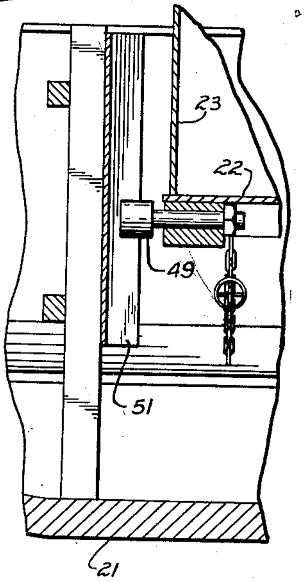
Figure 12:
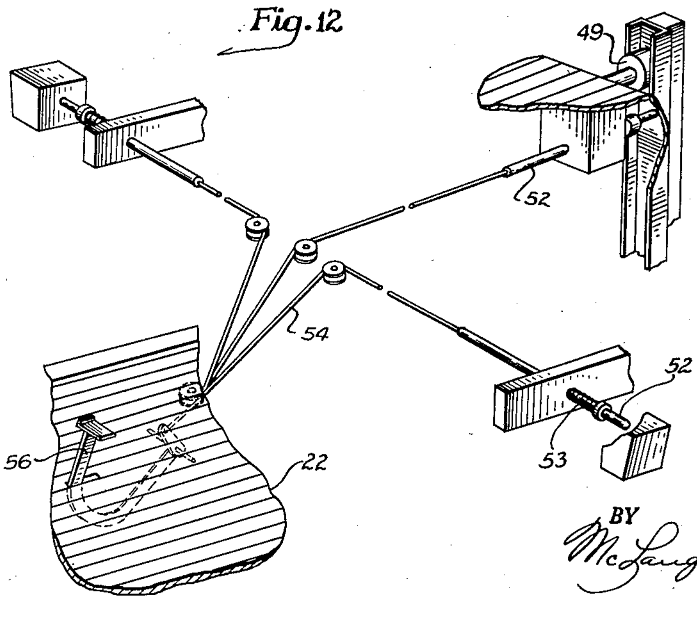
Figure 14:
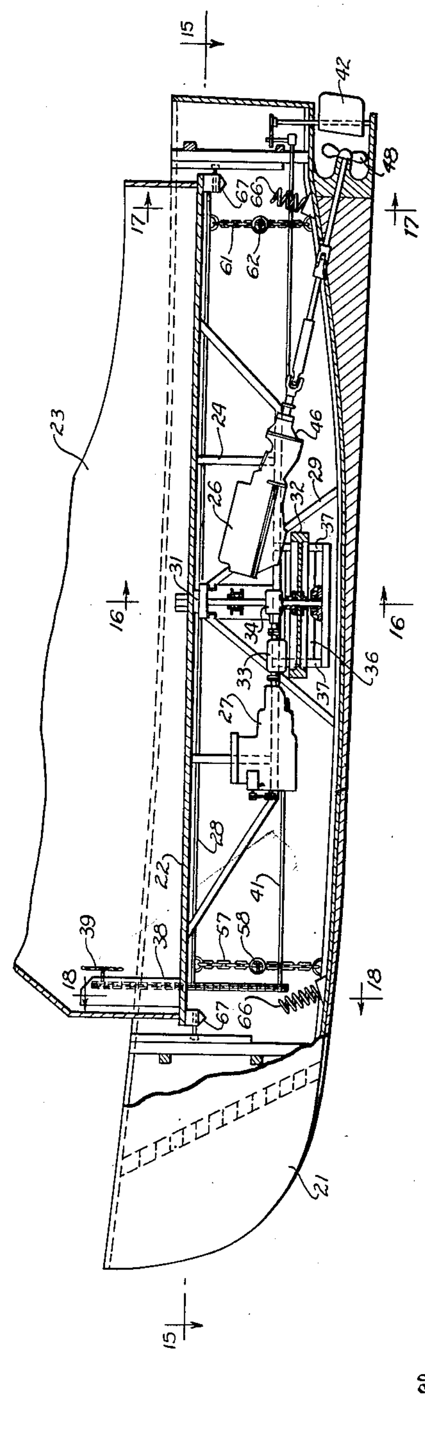
Figure 15:
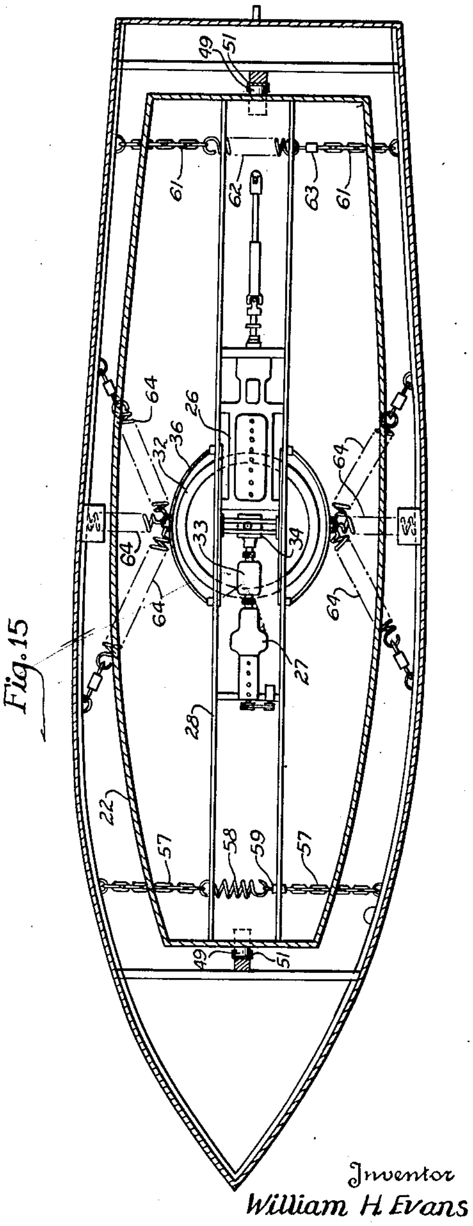

Figs. 7 and 8 are fragmentary transverse sectional views taken on the lines 7—7 and 8—8, respectively, of Fig. 5;

Fig. 9 is an enlarged fragmentary elevational view showing the pivot between the hull and deck structure and apparatus immediately adjacent thereto;

Fig. 10 is an enlarged fragmentary sectional view partly in elevation, taken on the line 10—10 of Fig. 5;

Fig. 11 is a fragmentary perspective view showing some of the control apparatus and the propeller shaft arrangement;

Fig. 12 is an exploded partially schematic view showing the manner of releasably fixing the deck structure to the hull;

Fig. 13 is a fragmentary sectional view taken on the line 13—13 of Fig. 8;

Fig. 14 is a sectional view similar to Fig. 5 but showing a modified construction;

Fig. 15 is a plan sectional view taken on the line 15—15 of Fig. 14; and

Figure 16:
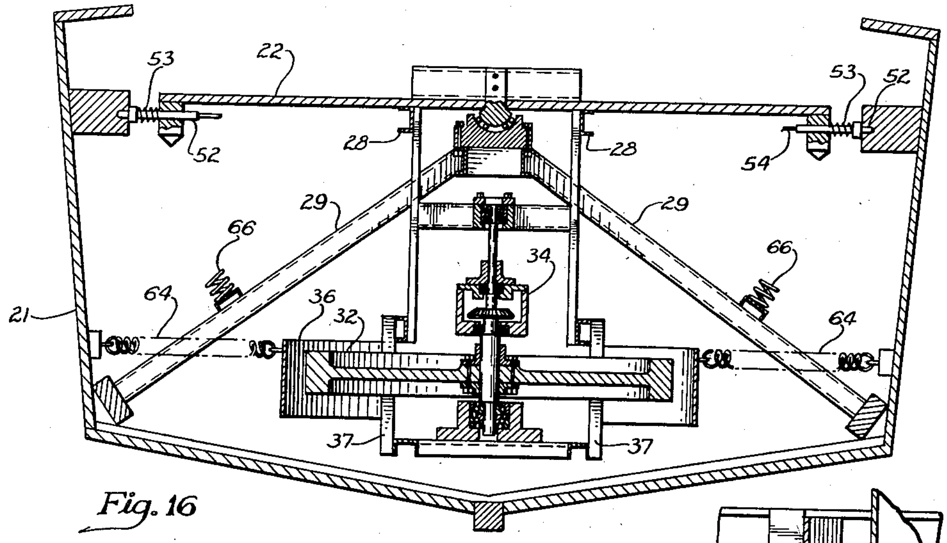
Figure 17:
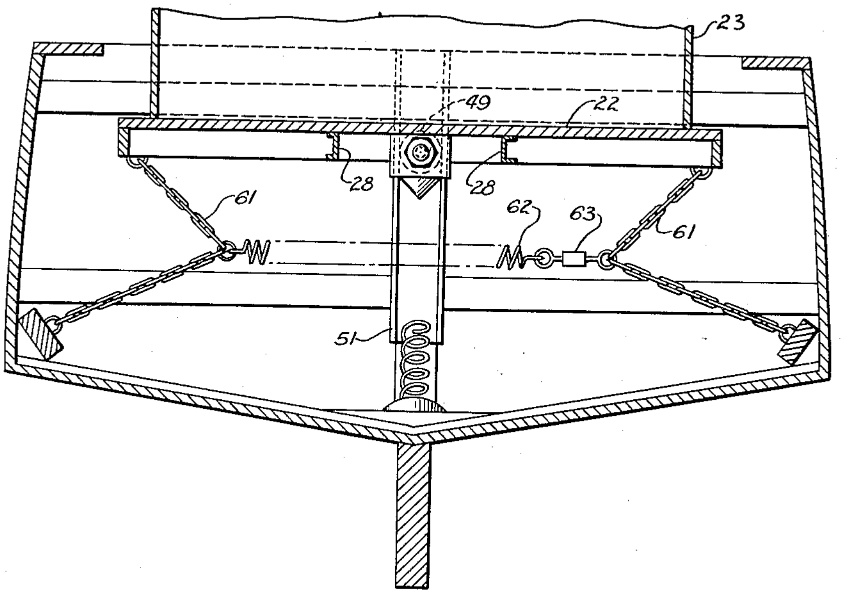
Figure 18:
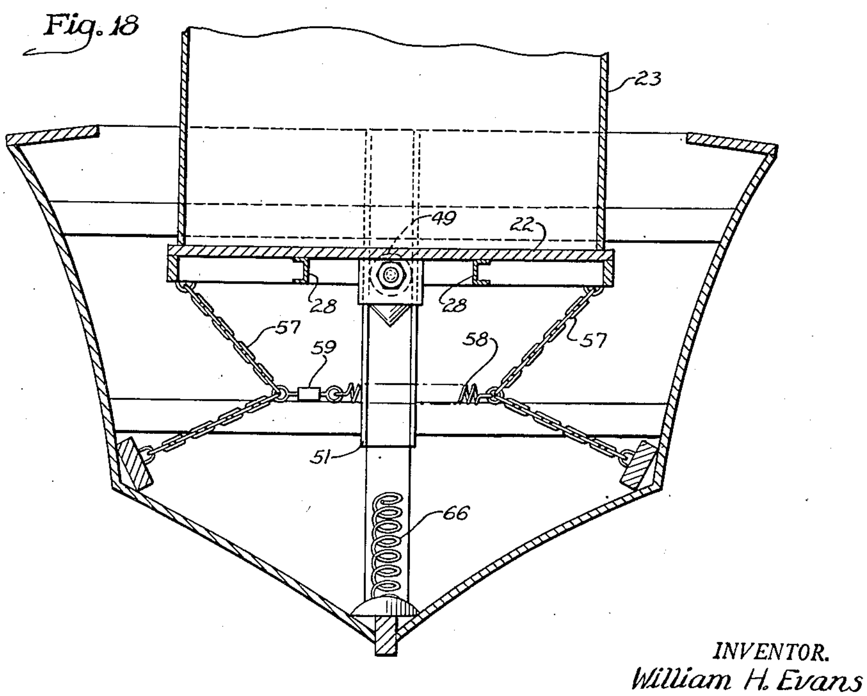

Figs. 16, 17 and 18 are transverse sectional views taken on the lines 16—16, 17—17, and 18—18, respectively, of Fig. 14.

Figure 1:
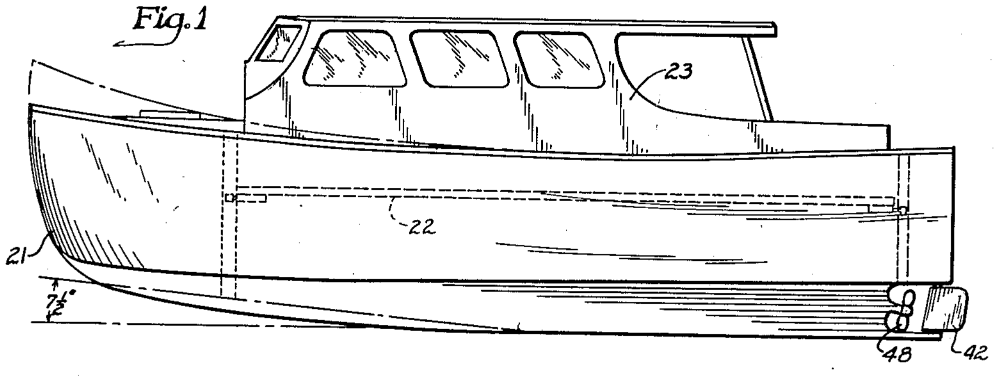
Fig. 1 is an elevational view.
Figure 2:
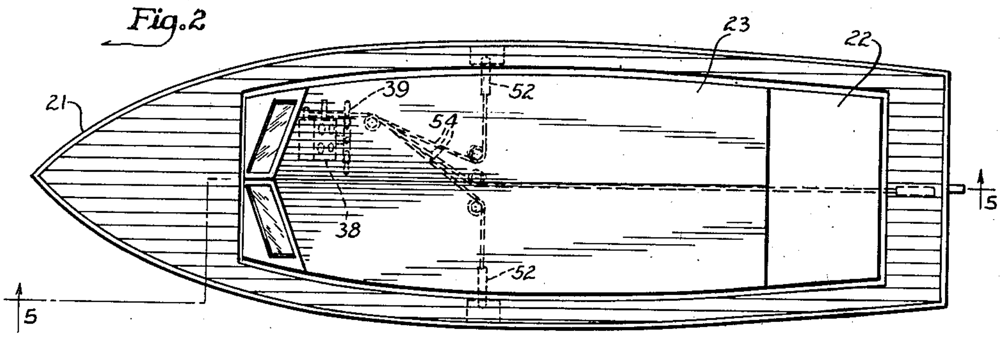
Fig. 2 is a plan view.
Figure 3:
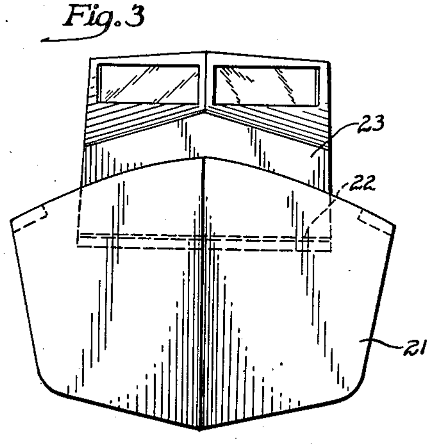
Figs. 3 and 4 are end views showing the normal and action position of the deck and hull, respectively.
Figure 4:
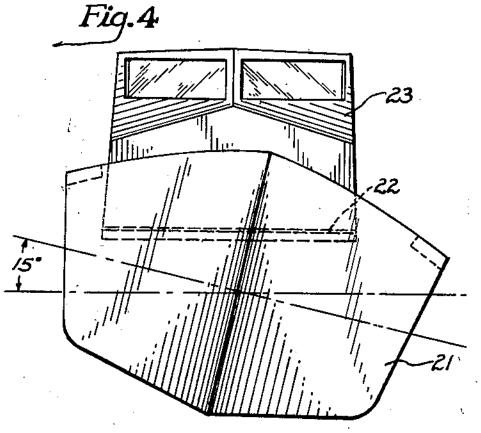

In the first form of invention shown in Figs. 1–13, inclusive, the boat comprises a hull 21, a deck 22 and a superstructure 23 in the nature of a cabin. The deck assembly comprising the deck, superstructure and related parts is pivoted to the hull with a major portion of the suspended weight below the point of support so that without the stabilizing action of any other portion of the assembly there is a tendency for the deck to remain stationary as the hull moves in the water. This general relation is described in my prior application and the drawings, particularly, Figs. 1, 3 and 4, illustrate the permitted character of movement between the deck assembly and hull assembly. The drawings indicate relative movement as the hull pitches or rolls, but it will be understood that any combination of these movements is also permitted because of the substantially universal joint type of connection provided for sustaining the deck assembly. The boat of my invention may follow conventional boat design so far as fabrication procedures are concerned, and, also, the hull may be formed of wood or metal as indicated by the special design. I have not attempted to show all of the details of construction because it would be impossible to do so, and, moreover, conventional boat structures are of no significance in the present invention except that those skilled in the art should understand that the use of my invention does not require any particular type of hull and like construction not known in the art. It will, moreover, be understood by those skilled in the art that the drawings cannot be shown entirely in accordance with scale because it is necessary to distort certain parts and modify dimensions in order to make a clear showing of the principles involved. Certain parts, for example, have been enlarged fifty to one hundred times in proportion to the remaining dimensions of the boat in order to make a clear showing of their construction.

As a part of the deck structure or deck assembly, I provide a cradle 24 for supporting engines 26 and 27 and other structures as will be described. This cradle is formed of suitable steel members such as channel iron, angles or the like, and carries above it a pair of longitudinal members 28 which carries the deck. The deck itself has such required cross members and the like as may be necessary to form a solid structure. The deck assembly is supported by a yoke 29 comprising essentially pyramidally disposed supports anchored to the hull at their bottoms in such a manner as to distribute the load over a relatively large portion of the hull. The top of the yoke is shaped to carry one part of a universal joint 31 of a low friction type, the top portion of the universal joint forming a part of the cradle so that the cradle with its supported weight is suspended through a low friction universal joint to the yoke. Suitable details of construction are shown in the prior copending application, and Fig. 10 shows some structural features which have been found advantageous.

The principal weight forming portion of that portion of the deck assembly carried on the cradle comprises the two engines 26 and 27. The former is a main driving engine for propelling the boat and the latter drives a gyroscope wheel 32 suitably journalled in bearings carried by the cradle. I have found that a so-called hydromatic drive 33 is suitably interposed between the engine 27 and a gear box 34 from which the gyro shaft is driven. The hydromatic drive 33 is of a well-known type in which a hydraulic fluid is employed for transmitting power to a driven member and in which automatic adjustment of gear ratio takes place. This arrangement facilitates bringing the gyroscope wheel up to speed and then maintaining it at speed without excessive load on the engine. The gyroscopic wheel has a pair of side guards 36 secured to the cradle by supports 37, and some of the supporting structure also provides means for carrying a bottom bearing for the gyroscopic wheel as shown.

Before describing some of the remaining features of the invention, I wish to point out that, as in the case of my previous application, the boat may operate in a normal manner with the usual controls, and articulated connections are provided so that mechanism associated with the hull may be controlled by equipment associated with the deck. In Fig. 11, a control box 38 is supported on the deck 22 and has a wheel 39 which rotates a shaft 41 through a sprocket chain connection for operating a rudder 42. The rudder bar and shaft 41 are interconnected by a sliding telescoping drive connection 43 with universal joints 44 at opposite sides thereof. Thus, regardless of lengthening or shortening of the distance between the control box and rudder and regardless of the movement between the deck and the hull, the usual steering mechanism can be operated. So, also, in the case of engine control, there is a gear box 46 suitably operated by mechanism such as shown, by lever 47 and through an articulated drive shaft operating a propeller 48. The arrangement, as in the case of the rudder, is such that the shaft may twist, bend, lengthen or shorten, without interrupting the drive connection.

As in my previous application, I provide means for permitting the deck assembly to move freely with respect to the hull about the universal joint pivot 31, by preventing rotatory movement about the pivot such as would be caused, for example, by the torque action of the gyroscopic wheel 32. To this end I provide fore and aft of the deck structure a roller 49 (note, particularly, Figs. 12 and 13) which extend into vertical channels 51 carried by the hull. The rollers 49 are substantially in line with the universal joint pivot 31 so that side movement which occurs when the hull rolls is substantially along the axis of such rollers 49. When the hull pitches, on the other hand, the rollers move along the channels in which they are supported, and, of course, as long as they are maintained in their channels there can be no relative movement between the deck and hull on a vertical pivot. In order to secure the deck and hull together as desired, I provide a number of locking bolts 52 at edges of the deck which are adapted to extend into suitable recesses in the hull structure, being urged in such directions by locking springs 53. The locking bolts 52 are connected to cables 54 secured to an operating device 56. The construction is such that by pressing a foot pedal comprising the operating device 56 the locking bolts can be retracted, but by releasing the member 56 the locking bolts are returned by their springs to engage the deck and hull. Suitable means, not shown, are provided to hold the locking bolts in retracted position.

To partially resiliently interconnect the deck assembly and hull assembly, I provide a spring and snubber arrangement which will now be described. Near the forward end of the deck chains 57 are connected between the hull and deck and they are in turn connected at substantially their mid-points by a spring 58, the tension of which can be controlled by turn buckle 59. Near the stern of the boat a similar arrangement is provided, involving chains 61, spring 62, and a turnbuckle device 63. Near the center of the boat and approximately in line with the pivot point are springs 64 tensioned between a portion of the engine cradle (here the side guards 36) and the hull. The chains 57 and 61 function to place an absolute limit to the relative movement of the deck and hull but as the chains are extended, their associated springs 58 and 62 are tensioned. Relative rocking movement modifies the tension on the springs 64, as will be explained. As the movement between deck and hull begins to reach a maximum the tension on the springs is increased and the greater the impact of a wave the greater the effect of partially stabilizing the hull by means of the balanced deck assembly. At no time, however, in normal operation of the boat is the deck structure, including the gyroscopic wheel, caused to take the full effect of a wave motion.

In addition to the springs described, I also provide bumper springs 66 fore and aft, the bumper springs being carried below decks on the hull and being adapted to be engaged by bumpers 67 secured to the bottom of the deck. Similar bumper springs 66 may also be employed at the sides (see Fig. 6). This provides additional means for adding to the stabilizing action of the springs heretofore described. I also provide a number of shock absorbers 68 and 69 which are connected between the deck and hull, these shock absorbers being of a type in which they are readily lengthened without appreciable expenditure of energy but can be shortened only with the expenditure of some energy and requiring a time interval. In the drawings, I show the shock absorbers directly connected between the deck and hull with a swivelable connection at each end and with a control 71 for varying the cross sectional area of a hydraulic orifice (not shown) so that the snubbing action of the mechanism may be controlled. I have employed an equivalent construction in actual practice with, however, a compound lever arrangement to translate the relatively great movement of the deck into relatively smaller movement of the shock absorber. For simplicity, however, I indicate a direct connection, but those skilled in the art will understand that a specially designed shock absorber will have to be provided if such direct connection is used.

In the form of the invention shown in Figs. 14–17, inclusive, I employ the same general arrangement as in the previously described embodiment but do not utilize the shock absorbers. For convenience, I have applied the same reference characters to these figures so that extensive discussion thereof is not required. In this embodiment, there is also a partial resilient interconnection between the deck and hull but instead of the shock absorbers with their snubbing action, I control the tension of the several springs so that a balance on dead center tension can be obtained. In this form of the invention, while there tends to be some overthrow on return to center, the action is something like placing two springs at the bottom of a pendulum. When the pendulum reaches its lowermost point, propelled at a rate greater than obtained by gravity alone, it will tend to pass the lowermost point but immediately compression begins to be applied to the engaged spring. The action is quickly to bring the pendulum to rest at the lowermost dead center point. I can secure the same general action by means of the spring by proper control of number of springs and tension, but, in general, the boat is more universally automatically adjustable to different types of water when the shock absorbers are also employed.

What I claim as new and desire to protect by Letters Patent of the United States is:

1. A boat comprising a hull, a yoke assembly carried by and projecting upwardly from a lower portion of the hull and having a central bearing at a point substantially at the intersection of the longitudinal and transverse axes of the hull, a deck assembly universally pivoted on said bearing, means including a gyroscope secured to and disposed below said deck assembly to stabilize the deck assembly for universal pivotal movement about said bearing so that said hull may respond to movements of the sea as the deck assembly remains relatively stationary, spring means connected between the deck assembly and hull and including springs located fore and aft of said bearing and springs located transversely of said bearing whereby the stable deck assembly receives part of the shock of the hull due to water action without itself being so affected thereby as to be moved substantially with the hull, and a plurality of shock absorbers located fore and aft of said bearing and interconnecting the hull and deck assembly and having a snubbing action in cooperation with said spring means.

2. A boat comprising a hull, a yoke assembly carried by and projecting upwardly from a lower portion of the hull and having a central bearing at a point substantially at the intersection of the longitudinal and transverse axes of the hull, a deck assembly universally pivoted on said bearing, means including a gyroscope secured to and disposed below said deck assembly to stabilize the deck assembly for universal pivotal movement about said bearing so that said hull may respond to movements of the sea as the deck assembly remains relatively stationary, and spring means connected between the deck assembly and hull and including springs located fore and aft of said bearing and springs located transversely of said bearing whereby the stable deck assembly receives part of the shock of the hull due to water action without itself being so affected thereby as to be moved substantially with the hull.

3. A boat comprising a hull, a yoke assembly carried by and projecting upwardly from a lower portion of the hull and having a central bearing at a point substantially at the intersection of the longitudinal and transverse axes of the hull, a deck assembly universally pivoted on said bearing, means including a gyroscope secured to and disposed below said deck assembly to stabilize the deck assembly for universal pivotal movement about said bearing so that said hull may respond to movements of the sea as the deck assembly remains relatively stationary, spring means connected between the deck assembly and hull and including springs located fore and aft of said bearing and springs located transversely of said bearing whereby the stable deck assembly receives part of the shock of the hull due to water action without itself being so affected thereby as to be moved substantially with the hull, said last mentioned means also including means for adjusting the force of the springs.

WILLIAM H. EVANS.

REFERENCES CITED

The following references are of record in the file of this patent:

UNITED STATES PATENTS

| Number | Name | Date |
|---|---|---|
| 967,278 | Wertheim | Aug. 16, 1910 |
| 1,021,116 | Ure | Mar. 26, 1912 |
| 1,108,318 | Beker | Aug. 25, 1914 |
| 1,149,100 | Wainola | Aug. 3, 1915 |
| 1,180,888 | Upton | Apr. 25, 1916 |
| 1,182,768 | Keene | May 9, 1916 |
| 1,365,712 | McLeod | Jan. 18, 1921 |
| 1,792,745 | Kasarinoff | Feb. 17, 1931 |
| 2,047,922 | Seligmann | July 14, 1936 |
| 2,466,164 | Evans | Apr. 5, 1949 |

FOREIGN PATENTS

| Number | Country | Date |
|---|---|---|
| 3,661 | Great Britain | Dec. 4, 1872 |
| 11,668 | Germany | Nov. 18, 1880 |
| 167,816 | Great Britain | Aug. 5, 1921 |